(12) United States Patent
Yamada

(10) Patent No.: US 11,122,181 B2
(45) Date of Patent: Sep. 14, 2021

(54) NON-TRANSITORY COMPUTER-READABLE RECORDING MEDIUM STORING COMPUTER-EXECUTABLE INSTRUCTIONS AND SETUP SYSTEM FOR SELECTING A DEVICE

(71) Applicant: BROTHER KOGYO KABUSHIKI KAISHA, Nagoya (JP)

(72) Inventor: Jun Yamada, Nagoya (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 0 days.

(21) Appl. No.: 16/531,228

(22) Filed: Aug. 5, 2019

(65) Prior Publication Data
US 2020/0053244 A1    Feb. 13, 2020

(30) Foreign Application Priority Data

Aug. 9, 2018 (JP) .............................. JP2018-150574

(51) Int. Cl.
*H04N 1/00* (2006.01)
*G06F 3/12* (2006.01)

(52) U.S. Cl.
CPC ....... *H04N 1/00973* (2013.01); *G06F 3/1231* (2013.01); *G06F 3/1232* (2013.01); *G06F 3/1253* (2013.01); *G06F 3/1292* (2013.01)

(58) Field of Classification Search
CPC ................................................. H04N 1/00973
See application file for complete search history.

(56) References Cited

U.S. PATENT DOCUMENTS

| 6,965,958 B1 * | 11/2005 | Sugiyama | ............. G06F 3/1204 |
| | | | 358/1.1 |
| RE39,801 E | 8/2007 | Marbry et al. | |
| 7,305,456 B2 | 12/2007 | Kobayashi | |

(Continued)

FOREIGN PATENT DOCUMENTS

JP    2016-177505 A    10/2016

OTHER PUBLICATIONS

U.S. Appl. No. 16/362,767 dated Mar. 25, 2019.
Notice of Allowance dated Jul. 1, 2020 from related U.S. Appl. No. 16/362,767, filed Mar. 25, 2019.

*Primary Examiner* — Jacky X Zheng
(74) *Attorney, Agent, or Firm* — Scully, Scott, Murphy & Presser, PC

(57) ABSTRACT

A PC APP is configured to cause an information processing apparatus to perform a determining process of determining a device, a setting process of setting the device determined by the determining process as a selected device of the information processing apparatus, a detecting process of detecting that the selected device set to an other information processing apparatus has been changed from a first device to a second device, a changed device information obtaining process of, when detecting the change of the selected device set to the other information processing apparatus by the detecting process, obtaining device information indicating the second device from the other information processing apparatus, and a setting changing process of changing the selected device of the information processing apparatus to the second device indicated by the device information obtained by the changed device information obtaining process.

7 Claims, 8 Drawing Sheets

(56) References Cited

U.S. PATENT DOCUMENTS

| | | |
|---|---|---|
| 7,600,226 B2 | 10/2009 | Aiba et al. |
| 7,903,267 B2 | 3/2011 | Yasui et al. |
| 8,261,259 B2 | 9/2012 | Hattori |
| 8,458,118 B1 | 6/2013 | Hale et al. |
| 9,213,512 B1 | 12/2015 | Montierth et al. |
| 2003/0169444 A1 | 9/2003 | Kemp et al. |
| 2007/0271267 A1 | 11/2007 | Lim et al. |
| 2009/0059272 A1 | 3/2009 | Matsushita et al. |
| 2012/0188600 A1 | 7/2012 | Oshima et al. |
| 2014/0368881 A1* | 12/2014 | Kawaura ............... G06F 3/1204 358/1.15 |
| 2016/0274835 A1 | 9/2016 | Mihira |
| 2016/0274883 A1 | 9/2016 | Iida |
| 2018/0267750 A1 | 9/2018 | Kobayashi |

\* cited by examiner

NON-TRANSITORY COMPUTER-READABLE RECORDING MEDIUM STORING COMPUTER-EXECUTABLE INSTRUCTIONS AND SETUP SYSTEM FOR SELECTING A DEVICE

CROSS-REFERENCE TO RELATED APPLICATIONS

This application claims priority under 35 U.S.C. § 119 from Japanese Patent Application No. 2018-150574 filed on Aug. 9, 2018. The entire subject matter of the application is incorporated herein by reference.

BACKGROUND

Technical Field

The present disclosures relate to a non-transitory computer-readable recording medium storing computer-executable instructions and a setup system.

Related Art

Conventionally, an application program for controlling devices such as a printer or a scanner has been known. Typically, there has been known a technique according to which, when a print application is installed in, for example, in a PC, the print application searches for printers and select one of the searched printers.

SUMMARY

In order to control a device with use of an application program, it is necessary that the device is selected by a user through a screen which is displayed by the application. For example, in a network in which one device is shared (i.e., commonly used) among a plurality of information processing apparatuses, if the device is changed to an other device, the other device should be selected from all the information processing apparatuses on the network. However, such device selection in each of the information processing apparatuses requires troublesome operations in view of the entire network, and improvement has been desired.

According to aspects of the present disclosure, there is provided a non-transitory computer-readable recording medium containing computer-executable instructions to be executed by a controller of an information processing apparatus. The instructions cause, when executed by the controller, the information processing apparatus to perform an identifying process of identifying a device set to the information processing apparatus as a selected device, the information processing apparatus being connected to a network, a detecting process of detecting that the selected device set to an other information processing apparatus, which is also connected to the network to which the information processing apparatus is connected, has been changed from a first device to a second device, a changed device information obtaining process of obtaining device information regarding the second device from the other information processing apparatus upon detection of the change of the selected device set to the other information processing apparatus, and a setting changing process of changing the device set to the information processing apparatus from the selected device to the second device indicated by the device information obtained in the changed device information obtaining process.

According to aspects of the present disclosure, there is provided a non-transitory computer-readable recording medium containing computer-executable instructions to be executed by a controller of an information processing apparatus. While a downloading request of an application program is transmitted from the information processing apparatus to a server storing the application program in response to the information processing apparatus receiving a change notification indicating that selected device set to an other information processing apparatus has been changed from a first device to a second device, device information indicating the second device and identifying information identifying the information processing apparatus are transmitted with the downloading request from the information processing apparatus to the server, and the device information and the identifying information is stored in the server, the instructions cause, when executed by the controller, the information processing apparatus to perform a server storing device information obtaining process of obtaining the device information corresponding to the identifying information of the information processing apparatus from the server at a particular timing during execution of installation of the application program or after execution of installation of the application program, an initial setting process of setting the second device indicated by the device information obtained by the server storing device information obtaining process as the selected device of the information processing apparatus, a determining process of determining a device, a setting process of setting the device determined by the determining process as the selected device of the information processing apparatus, and a notifying process of notifying the other information processing apparatus of a change notification indicating that the selected device is changed when the selected device of the information processing apparatus is changed by the setting process.

According to aspects of the present disclosure, there is provided a non-transitory computer-readable recording medium containing computer-executable instructions realizing a first program and a second program which are executable by a controller of an information processing apparatus. The first program, when executed by the controller, causes the information processing apparatus to perform a determining process of determining a device, and a setting process of setting the device determined by the determining process to the information processing apparatus as a selected device, the information processing apparatus being connected to a network. The second program, when executed by the controller, causes the information processing apparatus to perform a detecting process of detecting that the selected device set to an other information processing apparatus, which is also connected to the network to which the information processing apparatus is connected, has been changed from a first device to a second device, a changed device information obtaining process of obtaining device information regarding the second device from the other information processing apparatus, upon detection of the change of the selected device set to the other information processing apparatus by the detecting process, and a setting changing process of changing the selected device of the information processing apparatus to the second device indicated by the device information obtained by the changed device information obtaining process.

According to aspects of the present disclosure, there is provided a setup system including a first information processing apparatus and a second information processing apparatus in a same network. The first information processing apparatus is configured to perform determining a device, and setting the device determined by the determining process to the first information processing apparatus as a selected device. The second information processing apparatus is configured to perform detecting that the selected device set to the first information processing apparatus has been changed from a first device and a second device, when detecting the change of the selected device set to the first information processing apparatus, obtaining device information indicating the second device from the first information processing apparatus, and changing the selected device of the second information processing apparatus to the second device indicated by the device information.

According to aspects of the present disclosure, there is provided a setup system including a first information processing apparatus and a second information processing apparatus in a same network. While the first information processing apparatus transmits a downloading request of an application program to a server storing the application program in response to the first information processing apparatus receiving a change notification indicating that selected device set to the second information processing apparatus has been changed from a first device to a second device, the first information processing apparatus transmits device information indicating the second device and identifying information identifying the information processing apparatus with the downloading request to the server, and the server stores the device information and the identifying information, the first information processing apparatus is configured to perform obtaining the device information corresponding to the identifying information of the information processing apparatus from the server at a particular timing during execution of installation of the application program or after execution of installation of the application program, and setting the second device indicated by the device information obtained from the server as the selected device of the first information processing apparatus. The second information apparatus is configured to perform determining a device, setting the determined device as the selected device of the second information processing apparatus, and notifying the first information processing apparatus of a change notification indicating that the selected device is changed when the selected device of the second information processing apparatus is changed.

BRIEF DESCRIPTION OF THE ACCOMPANYING DRAWINGS

DETAILED DESCRIPTION OF EMBODIMENT

Hereinafter, referring to the accompanying drawings, a setup system using an application program (hereinafter, referred to as APP) according to an illustrative embodiment of the present disclosures will be described. According to the illustrative embodiment, the setup system is configured such that a common device is shared (i.e., commonly used) by a plurality of information processing apparatuses.

Figure 1:
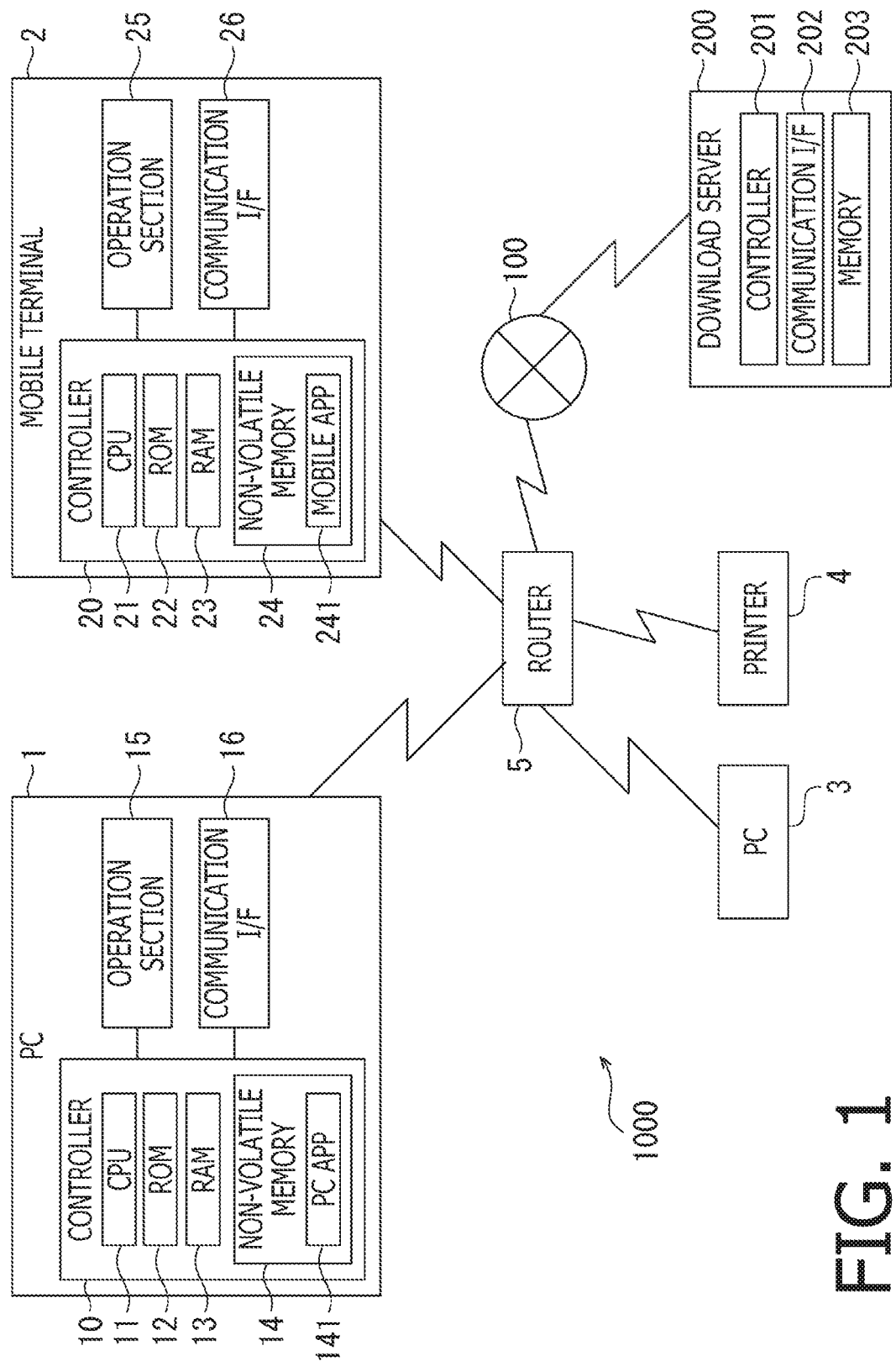
FIG. 1 is a block diagram showing an electrical configuration of a setup system according to an embodiment of the present disclosures.

The setup system 1000 according to the illustrative embodiment includes, as shown in FIG. 1, a personal computer (hereinafter, referred to as a PC) 1, a mobile computer (hereinafter, referred to as a mobile terminal) 2, a PC 3 and a printer 4, which are interconnected through a router 5 so as to be mutually communicatable with each other. Each of the PC 1, the mobile terminal 2, the PC 3 is an example of an information processing apparatus, while the printer 4 is an example of a device. It is noted that each of the PC 1, the mobile terminal 2 and the PC 3 may be an example of a first information processing apparatus or an example of a second information processing apparatus.

The printer 4 is a device having an image processing function and could be a printer, an MFP, a copier or a scanner. In the setup system 1000 according to the embodiment, any one of the PC 1, the mobile terminal 2 and the PC 3 can use the printer 4.

The PC 1 is an apparatus in which various types of programs can be executed. As shown in FIG. 1, the PC 1 has a controller 10 including a CPU 11, a ROM 12, a RAM 13, a non-volatile memory 14. Further, the PC 1 includes an operation section 15 and a communication I/F 16, which are electrically connected to the controller 10. The controller 10 is an example of a controller. It is noted that the CPU 11 may be an example of the controller. Each of the ROM 12, the RAM 13 and the non-volatile memory 14 is an example of a memory. If the CPU 11 is provided with a CPU buffer, the CPU buffer could also be an example of the memory.

The ROM 12 stores a startup program for starting the PC 1. The RAM 13 is used as a work area when various processes are performed. Alternatively, the RAM 13 is used as an area temporarily storing data. The non-volatile memory 14 is, for example, an HDD or a flash memory, which is used as an area storing various programs, data and/or settings. The CPU 11 is configured to perform various processes in accordance with programs retrieved from the ROM 12 or the non-volatile memory 14, and/or user's instructions.

In the non-volatile memory 14, PC APP 141 which is executed to use the printer 4 is stored. The PC APP 141 is compliant to a plurality of types of printers including the printer 4. The PC APP 141 receives a user instruction to designate a device which is made to perform an image processing, and sets the designated device as a selected device. The PC APP 141 is used when, for example, a user using the PC 1 wants to make the printer 4 perform printing. The PC APP 141 has a function of transmitting image data which can be used by the printer 4 to the printer 4.

The operation section 15 is hardware configured to receive user operations and display information. Specifically, the operation section 15 includes a displaying device (e.g., a display) and an input device (e.g., a keyboard and a mouse). The operation section 15 may be a user interface having both an input function and an output function (e.g., a touch panel). The communication I/F 16 includes hardware which is configured to perform a communication with various external apparatuses. The communication method employed by the communication I/F 16 may be a wired communication or a wireless communication. Further, the PC 1 may have a plurality of communication I/F's 16 respectively compliant to different communication methods.

The mobile terminal 2 is more portable than the PC 1, and is configured to perform various programs. As shown in FIG. 1, the mobile terminal 2 has a controller 20 including a CPU 21, a ROM 22, a RAM 23 and a non-volatile memory 24. The mobile terminal 2 further includes an operation section 25 and a communication I/F 26, which are electrically connected with the controller 20. The controller 20 is an example of a controller. It is noted that the CPU 21 may be an example of the controller. Each of the ROM 22, the RAM 23 and the non-volatile memory 24 is an example of a memory. If the CPU 21 is provided with a CPU buffer, the CPU buffer could also be an example of the memory.

The ROM 22 stores a startup program for starting the mobile terminal 2. The RAM 23 is used as a work area when various processes are performed. Alternatively, the RAM 23 is used as an area temporarily storing data. The non-volatile memory 24 is, for example, a flash memory, which is used as an area storing various programs, data and/or settings. The CPU 21 is configured to perform various processes in accordance with programs retrieved from the ROM 22 or the non-volatile memory 24, and/or user's instructions.

In the non-volatile memory 24, mobile APP 241 which is executed to use the printer 4 is stored. The mobile APP 241 is, for example, APP used when a user of the mobile terminal 2 wants to make the printer 4 perform printing. It is noted that the types of the devices the mobile APP 241 is capable of using may be different from the types of the devices the PC APP 141 is capable of using.

The operation section 25 is hardware configured to receive user operations and display information. Specifically, the operation section 25 includes a touch panel. The communication I/F 26 includes hardware which is configured to perform a communication with various external apparatuses. In view of portability of the mobile terminal 2, it is preferable that the communication method employed by the mobile terminal 2 is a wireless communication. However, it is of course possible that a wired communication is employed. Further, the mobile terminal 2 may have a plurality of communication I/F's 26 respectively compliant to different communication methods.

The PC 3 has substantially the same configuration as the PC 1 has. It is noted that the controllers 10 and 20 shown in FIG. 1 are terms collectively indicating hardware and software used to control the PC 1, the mobile terminal 2 and the PC 3, and do not necessarily indicate a single piece of hardware existing in each of the PC 1, the mobile terminal 2 and the PC 3.

The router 5 is a device relaying networks. According to the illustrative embodiment, the router 5 is connected to the Internet 100. Accordingly, each of the PC 1, the mobile terminal 2 and the PC 3 can access the Internet 100 through the router 5.

To the Internet 100, the download server 200 is connected. Accordingly, each of the PC 1, the mobile terminal 2 and the PC 3 can use data stored in the download server 200 through the Internet 100. It is noted that the download server 200 is an example of a server. As shown in FIG. 1, the download server 200 includes a controller 201, a communication I/F 202 and a memory 203. The download server 200 is capable of executing various programs. The communication I/F 120 includes hardware which is used to communicate with an external apparatus through the Internet 100.

It is noted that the download server 200 need not be configured by a single apparatus, but could be configured by a plurality of apparatuses which cooperate with each other. For example, at least a part of the memory 203 may be arranged on another apparatus which is accessible from the download server 200. Even in such a case, in the following description, an expression such as "the memory 203 of the download server 200" may be used.

The memory 203 of the download server 200 according to the illustrative embodiment includes, for example, a ROM, a RAM and an HDD, and stores various programs and various pieces of data. In the memory 203, installers of a plurality of kinds of APP's including an installer of the PC APP 141 and an installer of the mobile APP 241, and manuals. The download server 200 is configured to transmit the installers and the like in response to requests from other apparatuses.

Next, an environment in which the PC 1, the mobile terminal 2 and the PC 3 share the printer 4 will be described. In this example, it is assumed that the same PC APP 141 is installed in the PC 1 and the PC 3, and both the PC 1 and the PC 3 use the printer 4 using the PC APP 141 installed therein. That is, the PC APP 141 of each of the PC 1 and the PC 3 is set such that the printer 4 is a usually used selected device. It is also assumed that the mobile terminal 2 uses the printer 4 using the mobile APP 241. The mobile APP 241 is also set such that the printer 4 is a usually used selected device. Each of the PC APP 141 and the mobile 241 stores selected device information indicating the selected device currently set therein. Each of the PC APP 141 and the mobile 241 can identify the selected device currently set thereto by reading the stored selected device information. It is noted that the identifying process of the selected device is an example of an identifying process.

In the following description, a case where a model of the printer 4 which has been used has been changed to the printer 4 of another model will be described. As the model of the printer 4 has been changed to another model, it becomes necessary to change the selected device of each of the PC APP's 141 of the PC 1 and PC 3 and the selected device of the mobile APP 241 of the mobile terminal 2. In the setup system 1000 according to the illustrative embodiment, when one of the PC 1, the mobile terminal 2 and the PC 3 (e.g., the PC 1) receives a device changing operation by a user, a device changing notification, which is information indicating change of the selected device, is transmitted from the apparatus (e.g., the PC 1) which has received the device changing operation to the other apparatuses (e.g., the mobile terminal 2 and the PC 3). When receiving the device changing notification, each of the other apparatuses (e.g., the mobile terminal 2 and the PC 3) automatically changes the selected device based on the device changing notification.

Hereinafter, operations of respective apparatuses when the user of the PC 1 has performed the device changing operation through the PC APP 141 of the PC 1 will be generally described referring to a sequence chart shown in FIG. 2. Processes referred to in the following description correspond to processes performed by respective CPU's 11 and 21 following commands described in PC APP 141 and the mobile APP 241. It is noted that operations performed by the OS's of the respective apparatuses are described as operations performed by the CPU's of the respective apparatuses. Further, in the following description, it is assumed that the printer 4 before the model is changed is referred to as a printer 4A and the printer 4 after the model is changed is referred to as a printer 4B. It is noted that the printer 4A is an example of a first device, and the printer 4B is an example of a second device.

Figure 2:
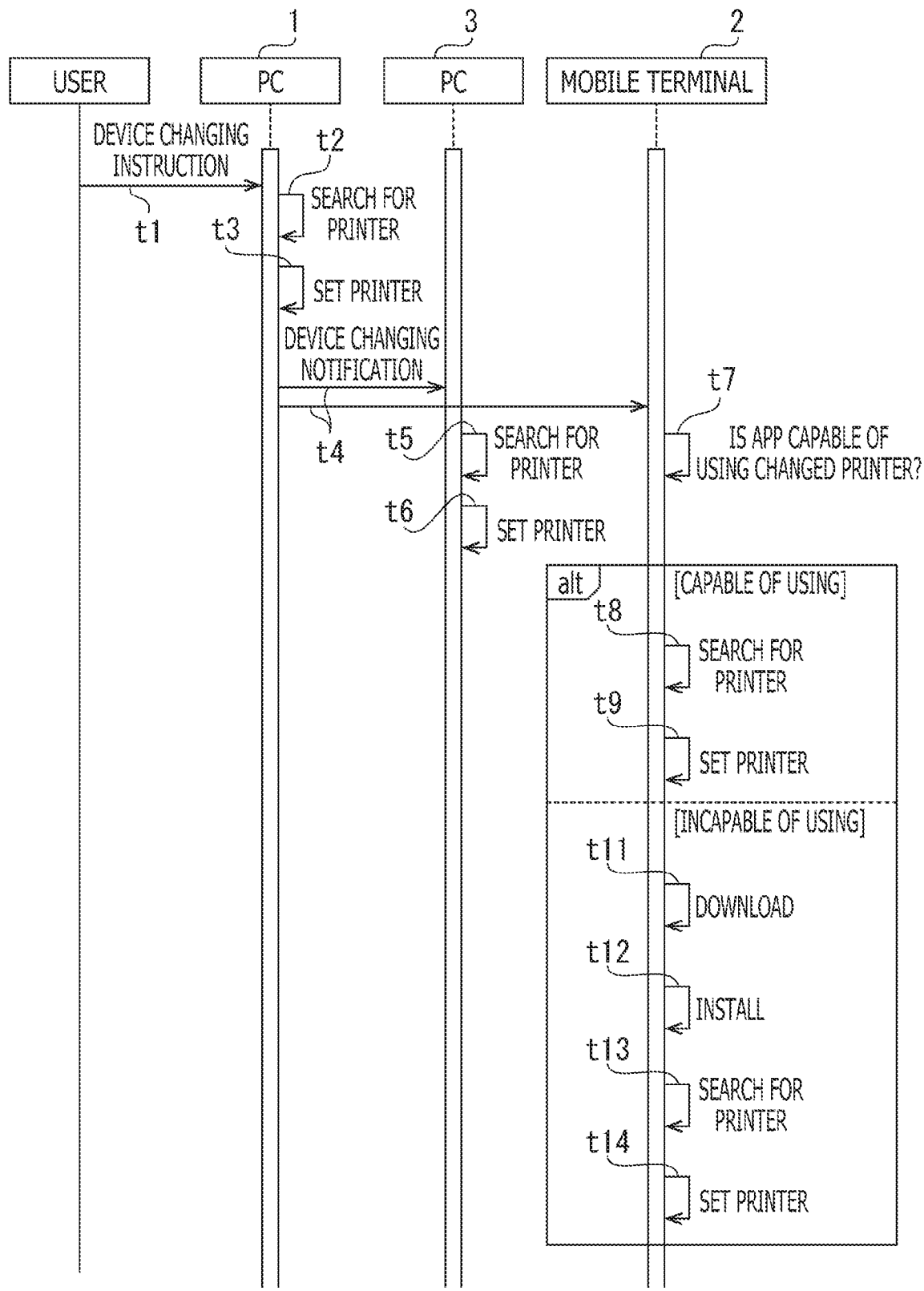
FIG. 2 is a sequence chart illustrating an example of a device changing process.

Further, in the example shown in FIG. 2, the PC APP 141 has been started up in each of the PC 1 and the PC 3, and the mobile APP 241 has been started up in the mobile terminal 2. Initially, the selected device of each APP is set to be the printer 4A. It is noted that, each reference tXX (XX being an integer), which is indicated in FIGS. 2, 5, 7 and 8 and recited in corresponding description, indicates a processing step. The integers XX affixed to letter "t" are for identifying respective steps and not intended to indicate order of the steps.

The PC 1 receives a user-input instruction to change the selected device from the printer 4A to the printer 4B (t1). Then, the PC 1 searches for the printer 4B which is designated as the newly selected device (t2). When the PC 1 has confirmed that the printer 4B is in a usable state, the PC 1 sets the printer 4B as the selected device of the PC APP 141 (t3). It is noted that the PC APP 141 is capable of using both the printer 4A and the printer 4B.

Next, the PC 1 transmits the device changing notification indicating that the device has been changed to the PC 3 and the mobile terminal 2 which uses the same device (i.e., the printer 4A) (t4). It is noted that the PC 1 may broadcast the device changing notification within the network. In response to receipt of the device changing notification, the PC 3 searches for the printer 4B (t5). It is noted that the device changing notification transmitted from the PC 1 contains information on the device after the change (i.e., the printer 4B).

When the PC 3 confirms that the printer 4B is in the usable state, the PC 3 sets the printer 4B as the selected device of the PC APP 141 (t6). Since the PC APP 141 of the PC 3 is the same as the PC APP 141 of the PC 1, the PC 3 is also capable of using the printer 4B. Accordingly, the PC 3 automatically sets the printer 4B as the selected device which is usually used by the PC APP 141 without the user's input of the instruction to change the device from the printer 4A to the printer 4B.

The mobile APP 241 running on the mobile terminal 2 is different from the PC APP 141 in terms of a user interface and the like. Models the mobile APP 241 is capable of using may be different from those the PC APP 141 is capable of using. Therefore, when the mobile terminal 2 receives the device changing notification transmitted from the PC 1, the mobile terminal 2 determines whether the mobile APP 241 is capable of using the changed device (i.e., the printer 4B) (t7). In other words, in t7, it is determined whether the mobile APP 241 supports the changed device.

When it is determined that the mobile APP 241 is capable of using the printer 4B, the mobile terminal 2 searches for the printer 4B (t8) and sets the printer 4B as the selected device (t9). Accordingly, the mobile terminal 2 automatically sets the printer 4B as the selected device which is usually used by the mobile APP 241 without the user's input of the instruction to change the device from the printer 4A to the printer 4B.

When it is determined that the mobile APP 241 is not capable of using the printer 4B, the mobile terminal 2 downloads the latest version of the mobile APP (t11). Specifically, the mobile terminal 2 accesses the download server 200 through the Internet 100, transmits a downloading request of the latest version of the mobile APP to the download server 200, and receives the installer of the mobile APP from the download server 200. That is, the mobile terminal 2 downloads another mobile APP which is capable of using the printer 4B and uses the same instead of the currently using mobile APP 241 in order to use the printer 4B.

Then, the mobile terminal 2 starts installing of the latest version of mobile APP using the downloaded installer (t12). After installation has completed, the mobile terminal 2 starts the latest version of the mobile APP. It is noted that starting of the installation and/or startup of the mobile APP may be performed in response to user's instructions. Further, the mobile terminal 2 may terminate the previous version of the mobile APP 241. Further, the mobile terminal 2 may perform searching for the printer 4B (t13) and set the printer 4B (t14) using the latest version of the mobile APP as the selected device.

It is noted that the mobile terminal 2 may be configured to automatically download the latest mobile APP (i.e., an installer of the latest mobile APP) which can use the printer 4B, without user's instruction input to download such an APP (i.e., the installer). Further, the mobile terminal 2 automatically sets the printer 4B as the selected device which is usually used by the latest mobile APP. A setting method of a printer by the latest mobile APP will be described later.

When the mobile terminal 2 receives an instruction to change the selected device, the mobile APP 241 of the mobile terminal 2 transmits the device changing notification. When the PC 1 and PC 3 receive the device changing notification, if the notified device can be used by the PC APP 141, each of the PC 1 and PC 3 automatically changes the selected device to the newly selected device. If the notified device cannot be used by the PC APP 141, each of the PC 1 and the PC 3 outputs a request to download the latest version of the PC APP.

Next, referring to a flowchart shown in FIG. 3, a print APP process, which is performed by the PC 1 (or the mobile terminal 2, the PC 3) to realize the above-described device changing operation will be described. The print APP process is a grogram making a printing device (e.g., the printer 4) perform a printing operation, and is performed by each of the PC APP 141 or the mobile APP 241. The print APP process is executed by the CPU 11 of the PC 1 (or the PC 3), or the CPU 21 of the mobile terminal 2 in response to start-up of the PC APP 141 in the PC 1 (or the pc3) or in response to start-up of the mobile APP 241 in the mobile terminal 2. In the following description, a case where the CPU 22 of the PC 1 executed the print APP process will be described.

In the print APP process, firstly, the CPU 11 determines whether a printer setting instruction input by a user is received (S101). When the CPU 11 receives a user operation to select a printer 4 from among selectable devices and another user operation to instruct to set the selected printer 4 to the usually used printer, the CPU 11 determines that the printer setting instruction is received. It is noted that a process of receiving the printer setting instruction in S101 is an example of a determining process.

It is noted that the setting of the printer may be performed by receiving a user operation through the operation section 15, or by the PC 1 with use of a barcode or the like printed on a package of the printer 4. In such a case, the PC 1 can obtain information regarding the printer 4 by reading the barcode or the like. As will be described later, the PC APP 141 or the mobile APP 241 may be configured to automatically set the usually used printer at a first star-up thereof. For example, after the first stat-up, the PC APP 141 or the mobile APP 241 may search for selectable devices and set one of the searched devices as a usually used printer.

When it is determined that the CPU 11 has received the printer setting instruction (S101: YES), the CPU 11 determines whether the received instruction is a printer changing instruction (S102). When the printer 4 designated by the printer setting instruction is the printer 4B which is different from the printer 4A currently used by the PC APP 141, the CPU 11 determines that the printer setting instruction is the printer changing instruction. When it is determined that the received instruction is the printer changing instruction (S102: YES), the CPU 11 performs the printer changing process (S103).

Figure 4:
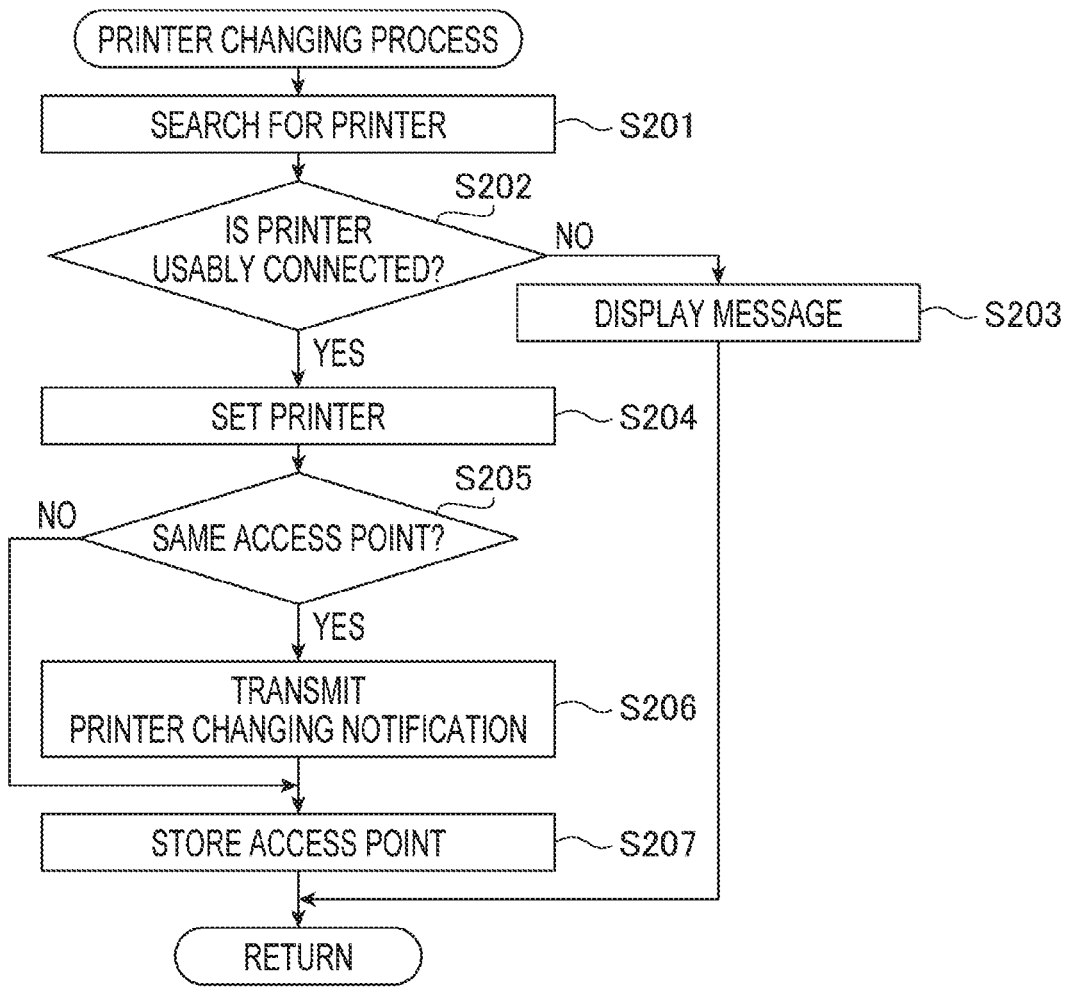
FIG. 4 is a flowchart illustrating a printer changing process according to the embodiment.

The printer changing process will be described in detail, referring to a flowchart shown in FIG. 4. It is noted that the printer changing process is a process to be performed when changing of the printer is instructed. In the printer changing process, firstly, the CPU 11 starts searching for the printer 4B which is the printer designated as the changed device (i.e., the device after changing) from among devices connected to the same network (S201). In S202, the CPU 11 determines whether the printer 4B usably connected to the network is found.

When it is determined that the designated printer 4B is not found, or the printer 4B is found but is not usably connected to the network (S202: NO), the CPU 11 makes the operation section 15 display a message indicating that the printer 4B is not available (S203) and terminates the printer changing process.

When it is determined that the printer 4B usably connected to the network is found (S202: YES), the CPU 11 sets the printer 4B as the selected device which is usually used by the PC APP 141 (S204). It is noted that the process of S204 is an example of a setting process. That is, the CPU 11 stores information indicating that the selected device usually used by the PC APP 141 is the printer 4B in the non-volatile memory 14.

In S205, the CPU 11 determines whether an access point currently connected is the same as the previously connected access point which is stored in the non-volatile memory 14. It is noted that the process of S205 is an example of an environment determining process. As will be described later, when the selected device is set, the CPU 11 stores information indicating an access point at a time when the selected device is set. It is noted that the information on the access point is an example of environment information indicating a network environment.

When it is determined that the current access point and the access point stored in the non-volatile memory 14 are the same (S205: YES), the CPU 11 controls the communication I/F 16 to transmit the device changing notification (S206). It is noted that the process of S206 is an example of a notifying process. The device changing notification is a notification indicating that the selected device of the PC APP 141 has been changed and includes information indicating the changed device (i.e., the device after changing) (i.e., the printer 4B) therein. The device changing notification is an example of a change notification. The CPU 11 transmits the device changing notification to each apparatus on the same network by broadcasting or multicasting.

When it is determined that the current access point and the access point stored in the non-volatile memory 14 are different (S205: NO), or after execution of S206, the CPU 11 stores the information regarding the currently connected access point in the non-volatile memory 15 (S207), terminates the printer changing process and returns to the print APP process. It is noted that the process in S207 is an example of a storing process.

When the current access point is not the same as the previous access point, it is highly possible that the network environment of the PC 1 has been changed. For example, when the current access point is different from the previous access point at a time when the device is set at a previous time as the PC 1 has moved from one network environment to another network environment, there is a possibility that the current device setting according to the current environment is a temporary setting. Once the PC 1 notifies the change of the selected device, as will be described, a process of changing the selected device is performed in all the apparatuses which have received the notification. Therefore, if the change of the selected device of the PC 1 is a temporary change, the device change notification will not be transmitted to the other devices so that load to the other apparatuses due to the device changing process is avoided.

Figure 3:
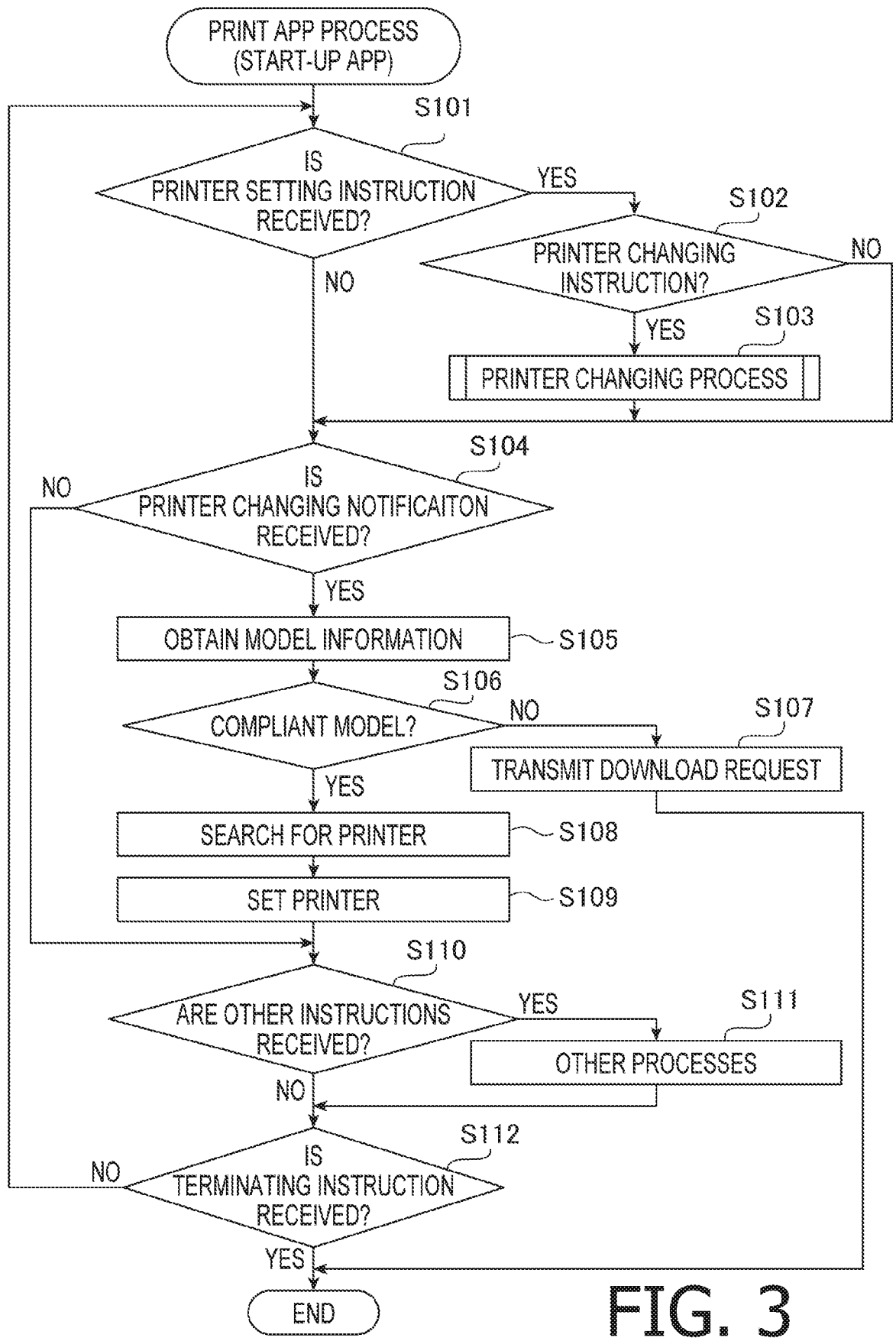
FIG. 3 is a flowchart illustrating a print APP process according to the embodiment.

Description on the print APP process shown in FIG. 3 is continued. When it is determined that the printer setting instruction has not been received (S101: NO), when it is determined that the received printer setting instruction is not an instruction to change the printer (S102: NO), or after execution of S103, the CPU 11 determines whether the device changing notification is received through the communication I/F 16 (S104). It is noted that the process of S104 is an example of a detecting process. The CPU 11 detects change of the selected device set to another apparatus by receiving the device changing notification from the other apparatus. The device changing notification, which is a subject of determination in S104, may be, for example, a notification transmitted from another apparatus in S206 of the printer changing process being executed in the other apparatus. The device changing notification is transmitted when, for example, the selected device has been changed from the printer 4A to the printer 4B in the other apparatus.

When it is determined that the device changing notification is received (S104: YES), the CPU 11 obtains model information of the device after changing (e.g., the printer 4B) based on the received printer changing information (S105). It is noted that the process in S105 is an example of a changed device information obtaining process. Further, the model information obtained in S105 is an example of device information. The model information of the device may be contained in the received device changing notification. Alternatively, the model information of the device may be obtained as the PC 1 requests the device from which the device changing notification is received for the model information of the device.

Next, based on the obtained model information, the CPU 11 determines whether the changed device (i.e., the device after changing) can be used by the PC APP 141 installed in the PC 1 (in other words, whether the PC APP 141 supports the changed device) (S106). It is noted that the process of S106 is an example of a support determining process. When it is determined that the changed device is of a model which cannot be used by the PC APP 141 (S106: NO), the CPU 11 transmits a download request requesting for downloading of a new APP supporting the changed device to the download server 200 through the communication I/F 16 (S107). When downloading of the new APP from the download server 200 has been completed, the CPU 11 terminates the print APP process. It is noted that the process of S107 is an example of a downloading process. When the PC APP 141 does not support the selected device which is set by the other apparatus, the PC APP 151 downloads a new APP supporting the selected device and installs the same therein so that the PC 1 can used the selected device which is set by the other apparatus.

When it is determined that the changed device is of a model which can be used by the PC APP 141 (S106: YES), the CPU 11 searches for the changed device (i.e., the printer 4B) from among the connected devices (S108). When the changed device (i.e., the printer 4B) is found, the PC APP 141 sets the printer 4B as the selected device (S109). It is noted that the process of S109 is an example of a setting changing process. When the selected device of the other apparatus has been changed, the device changing notification is transmitted from the other apparatus. When the PC 1 has received such a printer changing notification, the selected device of the PC 1 is immediately changed.

It is noted that delivery of the device changing notification may be performed by means of direct transmission between the apparatuses, broadcasting, or notification server or the like. When the notification server is used, a transmitting apparatus registers the device changing notification with the notification server, and a receiving apparatus receives, at an arbitrary timing, the registered device changing notification. That is, when the notification server is used, the receiving apparatus need not be activated when the notification is registered with the notification server, and it becomes highly possible that the receiving apparatus receives the notification without fail.

When it is determined that the device changing notification has not been received (S104: NO), or after execution of S109, the CPU 11 determines whether instructions of other processes have been received (S110). It is noted that the other processes include, for example, selection of printing data, execution of printing, changing of the print setting and the like. When it is determined that the instructions of the other processes have been received (S110: YES), the CPU 11 executes the process instructed to be executed (S111).

When it is determined that execution of the other processes has not been instructed (S110: NO), or after execution of S111, the CPU 11 determines whether an instruction to terminated the APP is received (S112). When it is determined that an instruction to terminate the APP is not received (S112: NO), the CPU 11 returns to S101 and repeats S101, S104, S110 and S112. When it is determined that the instruction to terminate the APP is received (S112: YES), the CPU 11 immediately terminates the print APP.

Figure 5:
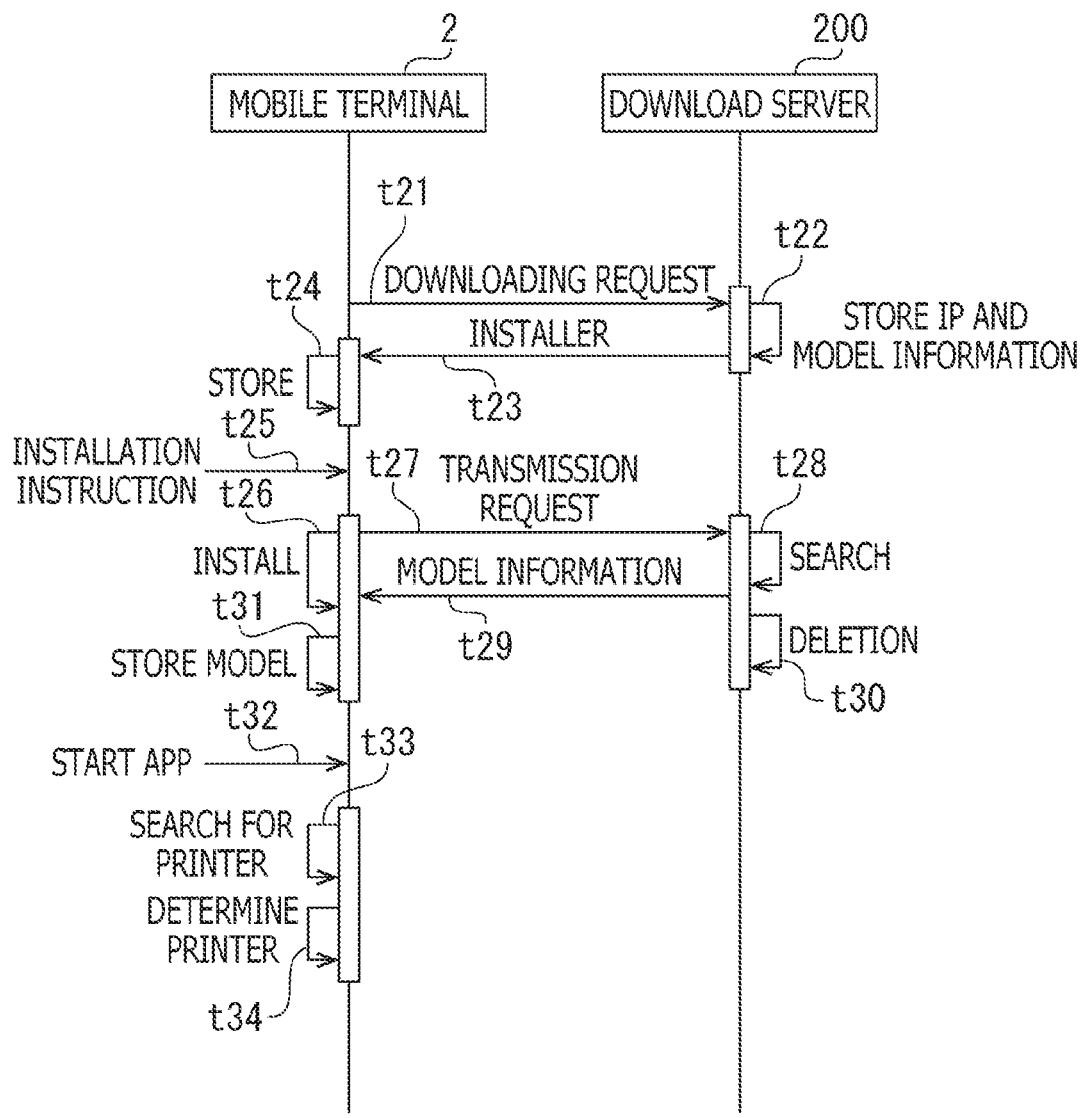
FIG. 5 is a sequence chart illustrating an example of a device setting process in which a setting of a new device is performed.

Next, a case where a downloading request is transmitted to the download server 200 will be described, referring to a sequence chart shown in FIG. 5. As mentioned above, when the PC APP 141 or the mobile APP 241 receives the device changing notification from the other apparatus (e.g., the PC 1) and determines that the PC APP 141 or the mobile APP 241 itself cannot use the changed device (e.g., the printer 4B), the PC APP 141 or the mobile APP 241 transmits a downloading request for downloading a new APP which can use the changed device (e.g., the printer 4B) to the download server 200. FIG. 5 shows a case where the mobile terminal 2 transmits the downloading request.

The mobile terminal 2 transmits a downloading request for downloading of a new APP to the download server 200 through the communication I/F 16 (t21). When transmitting the downloading request to the download server 200, the mobile terminal 2 adds model information regarding the changed printer (e.g., the printer 4B) to information for allowing downloading of the new APP (i.e., information causing the download serve to transmit an installer of the new APP). It is noted that the mobile terminal 2 may display information regarding downloading of the new APP, and transmit the downloading request to the download server 200 when the mobile terminal 2 receives a user instruction to transmit the downloading request.

The mobile terminal 2 transmits the downloading request using, for example, information including a URL for downloading with the model information of the printer 4B as a query. The URL for downloading is a URL containing information for executing a downloading program stored in the memory 203 of the downloading server 200. A query parameter which is added to the URL in the query format is delivered to the download server 200 as an argument of the downloading program.

The download server 200 selects an APP subject to be downloaded (i.e., an APP of which an installer is to be transmitted to the mobile terminal 2) based on the model information included in the downloading request. When an APP corresponding to the model information is not stored in the memory 203, the download server 200 may be configured to transmit an alert to the mobile terminal 2. Further, the mobile terminal 2 may be configured to display the alert on the operation section 25 when the mobile terminal 2 receives the alert in response to the downloading request.

The download server 200 stores the IP address of the apparatus from which the downloading request is received (i.e., the IP address indicating a transmission destination of the installer) and the model information obtained from the query parameter of the URL in the memory 203 in an associated manner (t22). It is noted that the IP address is an example of an apparatus identifying information. By once storing the information regarding the selected device of the other apparatus in the download server 200, it becomes possible to manage download history in the download server 200. It is noted that a MAC address or product ID may be used as the identification information of the apparatus instead of the IP address.

The download server 200 transmits the installer of the new APP of which downloading request has been received to the mobile terminal 2 (t23). The mobile terminal 2 receives the installer transmitted from the download server 200 and stores the same in the non-volatile memory 24 (t24). When the installer has been received, the mobile terminal 2 displays, on the operation section 25, for example, information indicating that downloading has completed and a button to be operated by the user to start installation using the downloaded installer.

When the mobile terminal 2 receives the instruction to start installation as the user operates the button (t25), the mobile terminal 2 starts the installer received at t23 to start installing the new APP (t26). Within a period from the start to the end of the installation, the mobile terminal 2 transmits a transmission request requesting transmission of the model information to the download server 200 (t27).

When the transmission request which is transmitted by the mobile terminal 2 is received, the download server 200 retrieves the mode information stored in the memory 203 in association with the IP address coinciding with the IP address indicating the transmission destination of the transmission request (t28). Then, the download server 200 transmits the retrieved model information to the mobile terminal 2 (t29), and deletes the model information having been transmitted from the memory 203 (t30).

When installation is being performed, the mobile terminal 2 receives the model information which is transmitted form the download server 200 and stores the same in the non-volatile memory 24 (t31). Specifically, the mobile terminal 2 creates a file at a particular storage area which is accessible by the new APP and stores information based on the received model information in the created file.

Next, the mobile terminal receives, for example, through a user operation, an instruction to start up the new APP (t32). The mobile terminal 2 retrieves the model information from the particular storage area during execution of the new APP and searches for printers corresponding to the retrieved model information by, for example, broadcasting or multicasting (t33). Further, the mobile terminal 2 automatically determines the searched (i.e., found) printer as the selected device of the new APP (t34).

Figure 6:
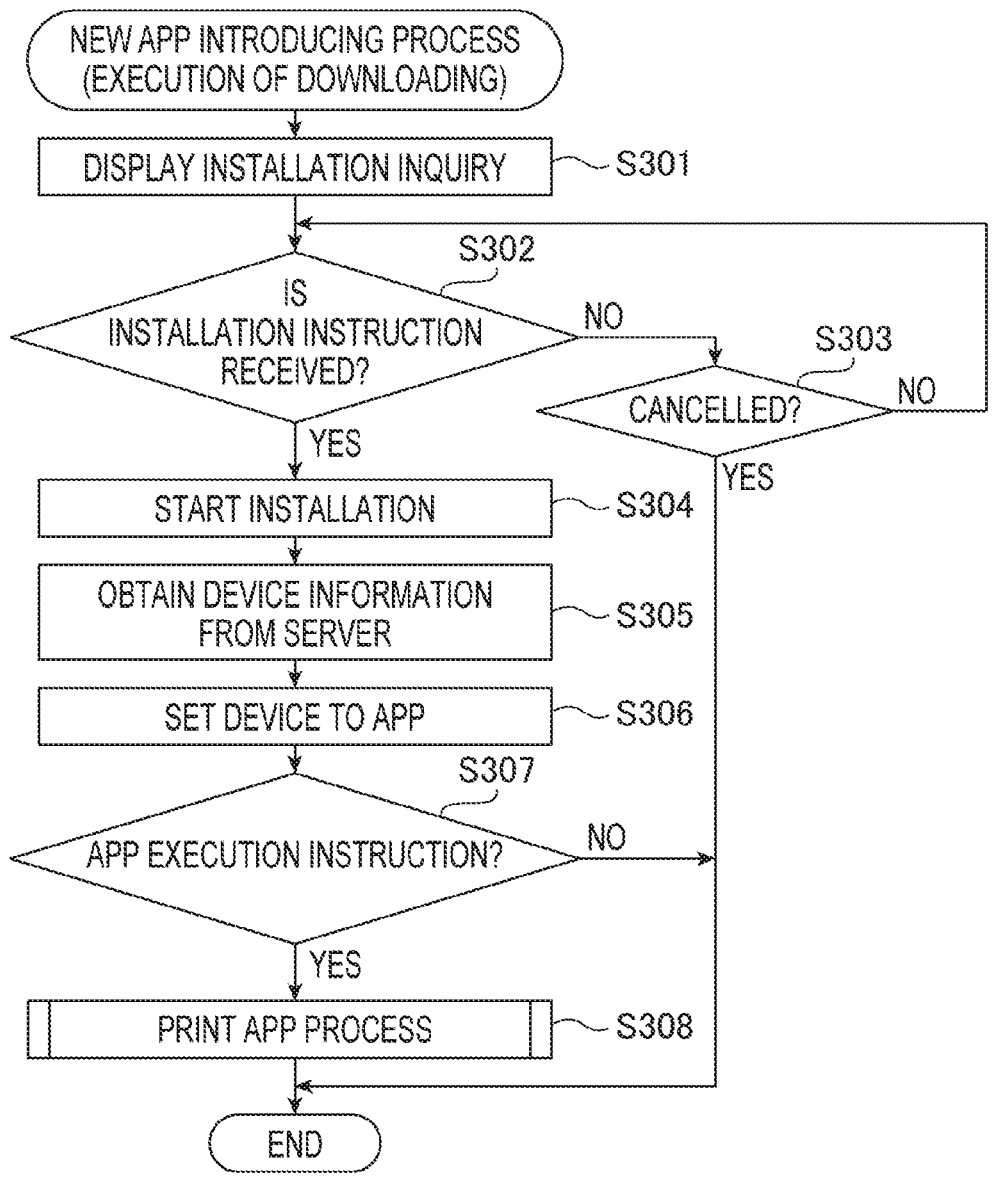
FIG. 6 is a flowchart illustrating a new APP introducing process according to the embodiment.

Next, a process of a new APP introducing process performed by the PC 1, the mobile terminal 2 or the PC 3 to realize the above-described operations which are depicted in the sequence chart shown in FIG. 5 will be described with reference to a flowchart shown in FIG. 6. The new APP introducing process is started, by the CPU 11 of the PC 1 or PC 3, or the CPU 21 of the mobile terminal 2, in response to execution of downloading of the new APP after transmitting the download request to the download server 200 in S107 of the print APP process. In the following description, a case where the CPU 21 of the mobile terminal 2 performs the new APP introducing process will be described.

In the new APP introducing process, the CPU 21 displays an inquiry asking a user whether installation of the new APP which has been downloaded it to be started (S301). Then, the CPU 21 determines whether an instruction to start installation has been received (S302). When it is determined that the instruction to start installation has not been received (S302: NO), the CPU 21 determines whether an instruction to cancel the installation has been received (S303). When it is determined that the instruction to cancel the installation has not been received (S303: NO), the CPU 21 returns to S302 and await reception of an instruction to start or cancellation of the installation.

When it is determined the instruction to start installation has been received (S302: YES), the CPU 21 start installing the new APP (S304). Next, the CPU 21 obtains information on the device from the download server 200 (S305, t29 of FIG. 5). It is noted that the process of S305 is an example of a server storing device information obtaining process.

As mentioned above, the download server 200 stores the IP addresses of the apparatus from which the download requests is received and the model information in an associated manner (t22 of FIG. 5). After the installation is started, the mobile terminal 2 requests the download server 200 for transmission of the model information (t27). If the mobile terminal 2 uses the same IP address when the downloading is requested and when the installation is requested, the download server 200 transmits the model information which is stored in association with the IP address (t29).

The CPU 21 sets the printer 4B as the selected device which is usually used by the new APP based on the model information obtained the download server 200. It is noted that the process of S306 is an example of an initial setting process. It is noted that the CPU 21 may search for the device to determine the printer 4B before performing the setting of the selected device.

By obtaining the model information on the selected device of the other apparatus, which has been stored in advance, from the download server 200 at a particular timing during execution of the installation, the CPU 21 can automatically set the selected device of the new APP using the model information. Accordingly, without requiring labor of the user, the selected device is newly set after downloading.

Further, the CPU 21 determines whether the instruction to execute the new APP is received (S307). When it is determined that the instruction to execute the new APP is received (S307: YES), the CPU 21 executes the print APP process (S308). After execution of the print APP, when it is determined that the instruction to execute the new APP has not been received (S307: NO) or when it is determined that an instruction of cancellation is received (S303: YES), the CPU 21 terminates the new APP instruction process.

It is noted that the timing at which the model information on the device is obtained from the download server 200 is not limited to a timing at which the new APP is installed. The timing at which the model information is obtained from the download server 200 may be a timing at which the new APP is firstly started after installation or a timing at which the device is firstly used after the new APP is firstly started up. It is noted that the printer 4B may not be connected with the mobile terminal 2 at the time of downloading. When the printer 4B is not connected with the mobile terminal 2, the mobile terminal 2 fails to search for the printer 4B, and the mobile terminal 2 cannot set the printer 4B as the selected device. Therefore, by obtaining the device information from the download server 200 after startup of the new APP, a possibility to set the printer 4B as the selected device is raised. In contrast, if the device information is obtained from the download server 200 at the time of the installation, since setting of the selected device is completed at the time of installation, the printer 4B can be used on or after start-up of the new APP, immediately.

In the above-description, an example in which the user of the PC 1 performs a device changing operation on the PC 1 and the device changing notification is transmitted from the PC 1 is explained. It is noted that a user who performs the device changing operation need not be limited to the user of the PC 1. That is, a user of the mobile terminal 2 or a user of the PC 3 may also perform the device changing operation on the mobile terminal 2 or the PC 3. In a case where the user of the PC 3 performs the device changing operation, the apparatus "PC 1" is replaced with the "PC 3" in the above description.

Figure 7:
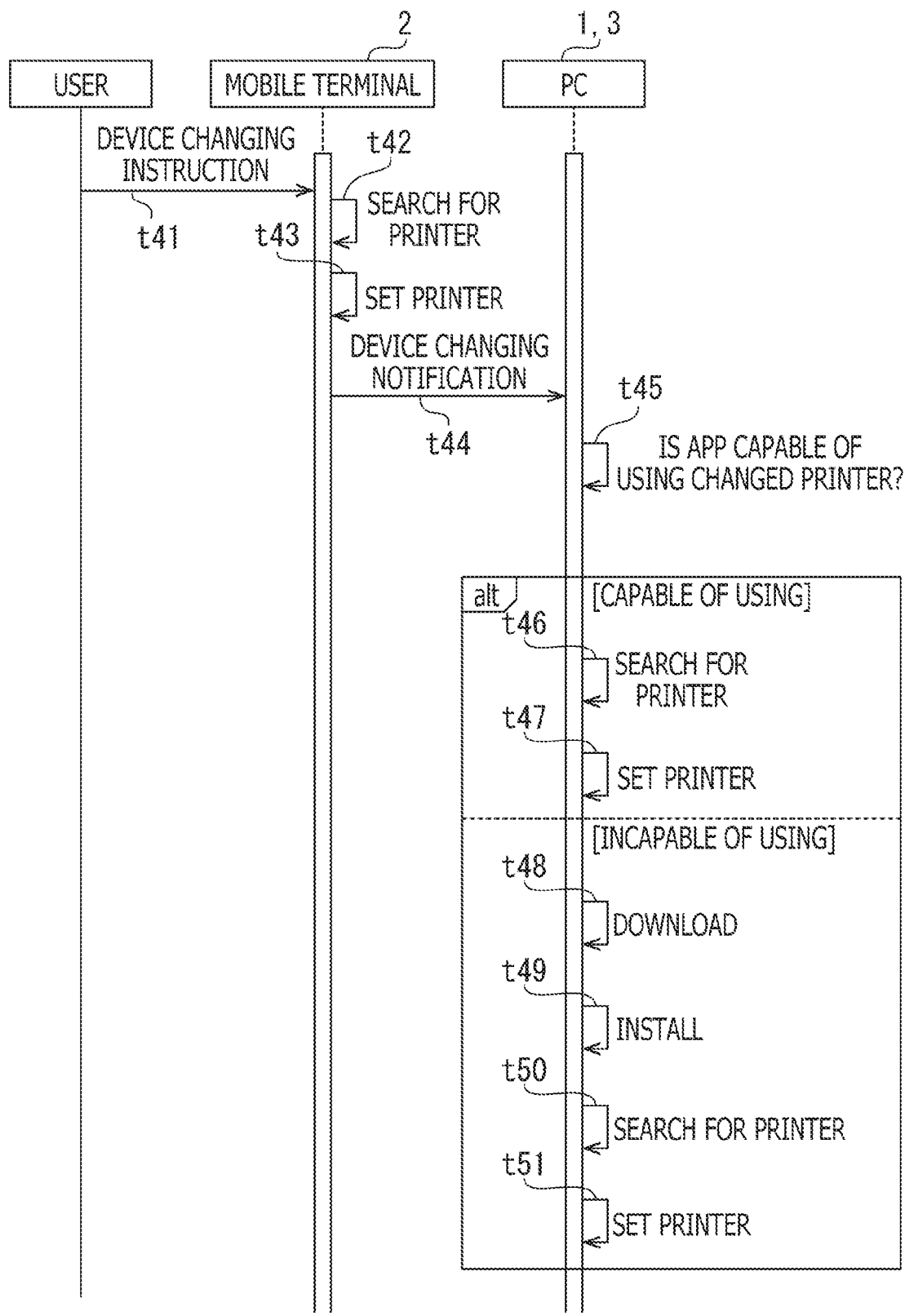
FIG. 7 is a sequence chart illustrating an example of a device changing process.
Figure 8:
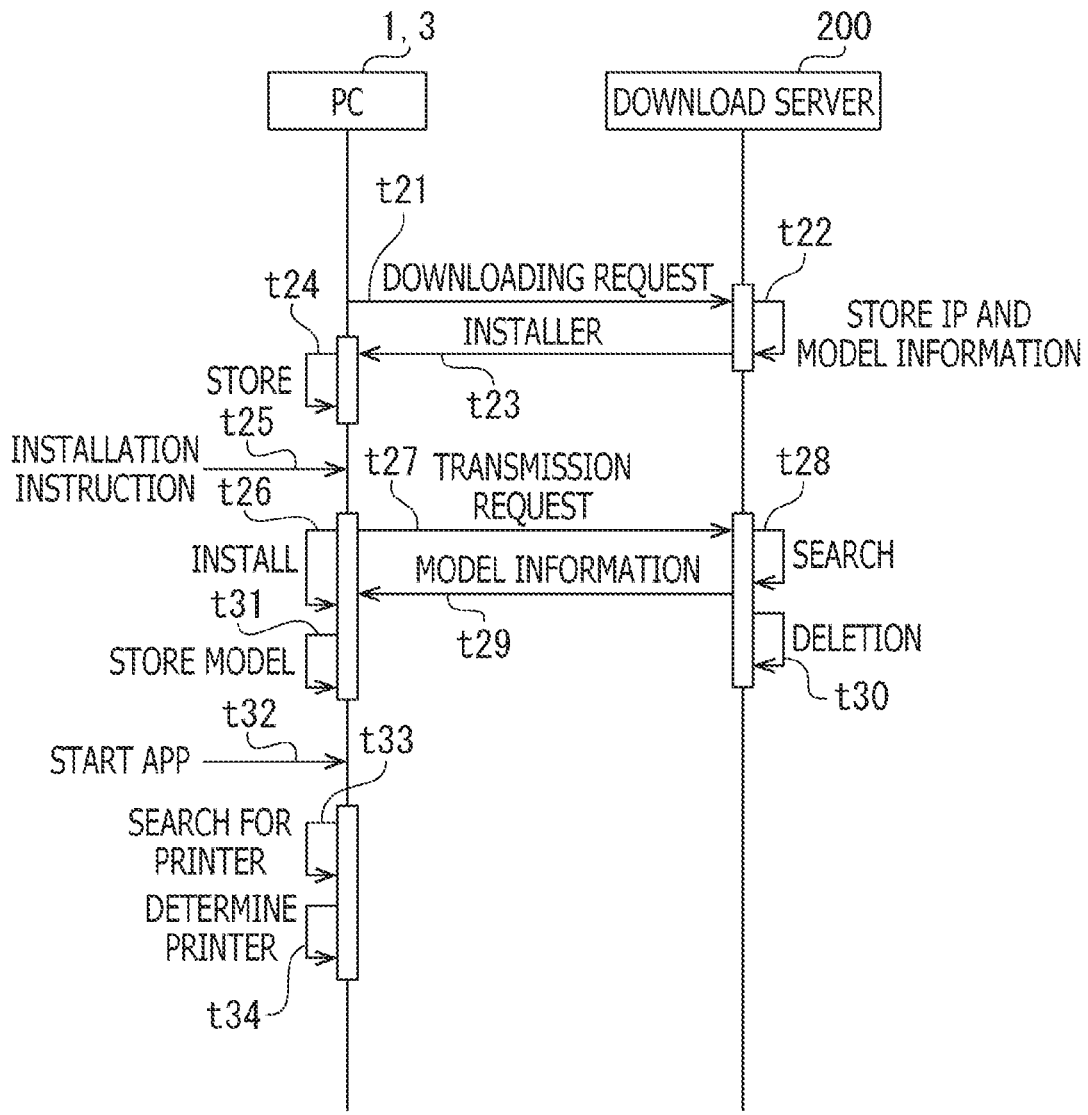
FIG. 8 is a sequence chart illustrating an example of a device setting process in which a setting of a new device is performed.

Next, an example in which the user of the mobile terminal 2 performs a device changing operation on the mobile terminal 2 and the device change notification is transmitted from the mobile terminal 2 will be explained, referring to a sequence chart shown in FIG. 7. It is noted that each of symbols t41~t51 recited in FIG. 7 indicates a process performed by the mobile terminal 2 or the PC 1 and the PC 3.

When the mobile terminal 2 receives a device changing instruction from the user (t41), the mobile terminal 2 searches for the printer 4B which is the designated device (t42), and sets the printer 4B as the selected device (t43). Then, the mobile terminal 2 transmits the device change notification to the PC 1 and the PC 3 (t44).

When receiving the device change notification, each of the PC 1 and the PC 3 determines whether the PC APP 141 can use the printer 4B (t45). When it is determined that the PC APP 141 can use the printer 4B (t46), each of the PC 1 and the PC 3 searches for the printer 4B (t46) and sets the same as the selected device (t47).

When it is determined that the PC APP 141 cannot use the printer 4B, each of the PC 1 and the PC 3 downloads the installer of the latest version of PC APP from the download server 200 (t48). Then, each of the PC 1 and the PC 3 installs the latest version of the PC APP (t49), searches for the printer 4B (t50) and sets the same as the selected device (t50).

At t48, each of the PC 1 and the PC 3 transmits a downloading request of the latest version of the PC APP to the download server 200. After transmission of the downloading request, the operation of each of the PC 1 and the PC 3 is illustrated in a sequence chart shown in FIG. 8 which is the same as that of the mobile terminal 2 (cf. FIGS. 5 and 8).

Specifically, each of the PC 1 and the PC 3 transmits the downloading request, to which the model information of the printer 4B in query format is added (t21), and receives the installer (t23). When receiving an instruction of installation (t25), each of the PC 1 and the PC 3 starts installation (t26) and transmits a transmission request requiring transmission of the model information to the download server 200 during the installation (t27). Then, each of the PC 1 and the PC 3 receives the model information from the download server 200 (t29) and stores the received model information in the non-volatile memory 24 (t31). Further, when the PC APP 141 is started (t32), each of the PC 1 and the PC 3 searches for the printer 4B based on the model information stored in the non-volatile memory 24 (t33) and sets the same as the selected device (t34).

According to the setup system 1000 as described above, when each of the PC 1, the mobile terminal 2 and the PC 3 detects change of the selected device set in the other apparatus on the same network, each of the PC 1, the mobile terminal 2 and the PC 3 automatically changes the selected device to one same as the changed device in the other apparatus. For example, when there are multiple information processing apparatuses on the same network, a device in the network has been changed to a new model, and the device of the new model is selected as the selected device in one of the multiple information processing apparatuses, the selected device of all of the other information processing apparatuses on the network are automatically changed to the new model. Accordingly, in view of an entire network, the more the number of the information processing apparatuses on the network are, the less the load to the users who change the selected device is.

It is noted that configurations of respective embodiments disclosed in the specification are only examples according to aspects thereof and are not intended to limit the aspects of the disclosures. Accordingly, the disclosed configurations can be modified or changed in various ways within aspects of the present disclosures. For example, the printers 4A and 4B are only examples of the device, which should not be limited to the printer but may be a copier, an MFP or a scanner which is controlled through the PC APP or the mobile APP, and more than one devices may be connected to the PC or the mobile terminal. Further, the number of the information processing apparatuses included in the setup system 1000 need not be limited to the number described above but can be any number.

According to the above-described embodiment, the device changing notification is transmitted from the apparatus which receives the device changing instruction. Aspects of the present disclosures do not limit the configuration to the above-described ones. For example, the APP of each apparatus may be configured to obtain the setting of other apparatuses (i.e., information on the selected devices set in other apparatuses) periodically and compare the obtained setting with the previously obtained setting to determine change of the device.

According to the above-described embodiment, when the network environment has been changed, the device changing notification is not transmitted. This configuration may be changed such that the device changing notification is transmitted regardless whether the network environment has been changed or not. Alternatively, an inquiry asking the user whether the device changing notification is to be transmitted or not when the network environment has been changed, and the device changing notification is transmitted when the user's instruction to transmit the same is received.

In the above-described embodiment, the printer changing process is described as a part of the print APP process. However, the printer changing process may be a process (i.e., a program) different from the print APP process. That is, the print APP process may be realized by a program set including a first program configured to set a determined device as a selected device, and a second program configured to detect change of the selected device in another apparatus and change the selected device of a self-apparatus to the changed device. Further, in the above-described embodiment, the downloading request is transmitted in the print APP process when the device changing notification is received. However, transmission of the downloading request may be performed by another program.

The above-described embodiment may be modified such that the device changing notification transmitted from another apparatus is received by the OS. When, for example, the OS receives the device changing notification, the OS may start up the PC APP 141 or the mobile APP 241 and deliver the received device changing notification to the PC APP 141 or the mobile APP 241 as started up. When it is determined that the PC APP 141 or the mobile APP 241 cannot use the changed device, information indicating that the PC APP 141 or the mobile APP 241 cannot use the changed device is delivered to the OS, and the OS may transmit the downloading request with adding the model information on the changed device. Even in such a case, after the installer of the new APP is downloaded from the download server, at a particular timing during an installation or after the installation, the OS can obtain the device information stored in the download server 200 when the downloading request was made. Accordingly, the changed device is automatically set as the selected device of the new APP, a load to the user for initial setting of the selected device can be suppressed.

In the above-described embodiment, the same PC APP 141 is installed in the PC 1 and the PC 3. However, the configuration of the setup system need not be limited to that of the embodiment. A PC APP installed in the PC 1 and a PC APP installed in the PC3 may be different to each other. In such a case, the PC 1 or the PC 3 may be configured such that, when the device change notification is received from another PC, the PC 1 or the PC 3 determine whether the changed device is usable. Further, each apparatus, which receives the device changing notification, may compare the currently set selected device with the changed device notified by the device changing notification. Then, each apparatus may perform searching for the changed device and/or determine whether the changed device is usable when the currently set selected device and the changed device notified by the device changing notification are different.

The processes disclosed in the above-described embodiment may be performed by a single CPU, multiple CPU's, hardware such as an ASIC or a combination of part of or all of the same. Further, the processes disclosed in the above-described embodiment may be realized by a non-transitory computer-readable recording medium storing programs (e.g., computer-executable instructions), methods or any other modes.

What is claimed is:

1. A non-transitory computer-readable recording medium containing computer-executable instructions to be executed by a controller of an information processing apparatus,
    wherein the instructions cause, when executed by the controller, the information processing apparatus to perform:
    an identifying process of identifying a device set to the information processing apparatus, the information processing apparatus being connected to a network;
    a detecting process of detecting that a selected device set to an other information processing apparatus, which is also connected to the network to which the information processing apparatus is connected, has been changed to a changed device newly set to the other information processing apparatus;

a changed device information obtaining process of obtaining device information regarding the changed device from the other information processing apparatus upon detecting, by the detecting process, that the selected device set to the other information processing apparatus has been changed to the changed device; and a setting changing process of changing the device set to the information processing apparatus to the changed device indicated by the device information obtained in the changed device information obtaining process.

2. The non-transitory computer-readable recording medium according to claim 1, wherein the instructions cause, when executed by the controller, the information processing apparatus to perform:

a support determining process of determining whether an application program installed in the information processing apparatus supports the changed device indicated by the device information obtained by the changed device information obtaining process before performing the setting changing process when detecting, by the detecting process, that the selected device set to the other information processing apparatus is changed to the changed device;

the setting changing process when the support determining process determines that the application program supports the changed device indicated by the device information; and a downloading process of downloading a new application program, which supports the changed device indicated by the device information, from a server storing the new application program when determining, by the support determining process, that the application program does not support the changed device indicated by the device information.

3. The non-transitory computer-readable recording medium according to claim 2, wherein the instructions cause, when executed by the controller, the information processing apparatus to transmit the device information and identifying information identifying the information processing apparatus to the server to cause the server to store the device information and the identifying information when the information processing apparatus transmits a downloading request of the new application program to the sever in the downloading process.

4. The non-transitory computer-readable recording medium according to claim 3, wherein the instructions cause, when executed by the controller, the information processing apparatus to perform:

a server storing device information obtaining process of obtaining the device information corresponding to the identifying information of the information processing apparatus from the server at a particular timing during execution of installation of the new application program or after execution of installation of the new application program; and an initial setting process of setting the changed device indicated by the device information obtained by the server storing device information obtaining process to the information processing apparatus.

5. The non-transitory computer-readable recording medium according to claim 1, wherein the instructions cause, when executed by the controller, the information processing apparatus to perform:

a determining process of determining a particular device;

a setting process of setting the particular device determined by the determining process as the device of the information processing apparatus; and a notifying process of notifying the other information processing apparatus of a change notification indicating that the device of the information processing apparatus is changed when the particular device is set to the information processing apparatus by the setting process, and wherein the information processing apparatus detects that the selected device set to the other information processing apparatus is changed, by receiving the change notification from the other information processing apparatus.

6. The non-transitory computer-readable recording medium according to claim 5, wherein the instructions cause, when executed by the controller, the information processing apparatus to perform:

a storing process of storing environment information indicating a network environment in a memory of the information processing apparatus when the particular device is set to the information processing apparatus by the setting process; and an environment determining process of determining whether current network environment is a same as network environment indicated by the environment information stored in the memory before executing the notifying process and the storing process, when the particular device is set to the information processing apparatus by the setting process, wherein, when it is determined that the current network environment is not a same as the network environment indicated by the environment information, the notifying process is not performed even if the particular device is set to the information processing apparatus by the setting process.

7. The non-transitory computer-readable recording medium according to claim 1, wherein the device set to the information processing apparatus is a printer.

* * * * *